Oct. 2, 1928.
E. NOEL
1,685,859
UNIVERSAL JOINT
Filed July 7, 1927
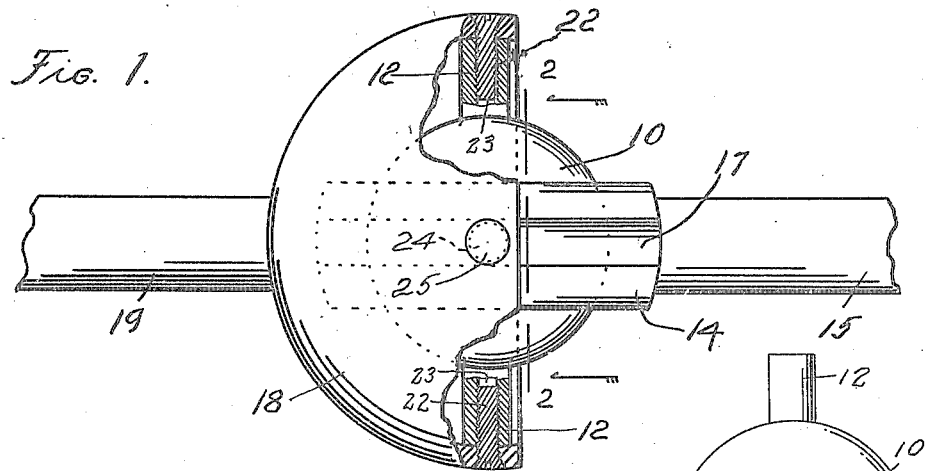
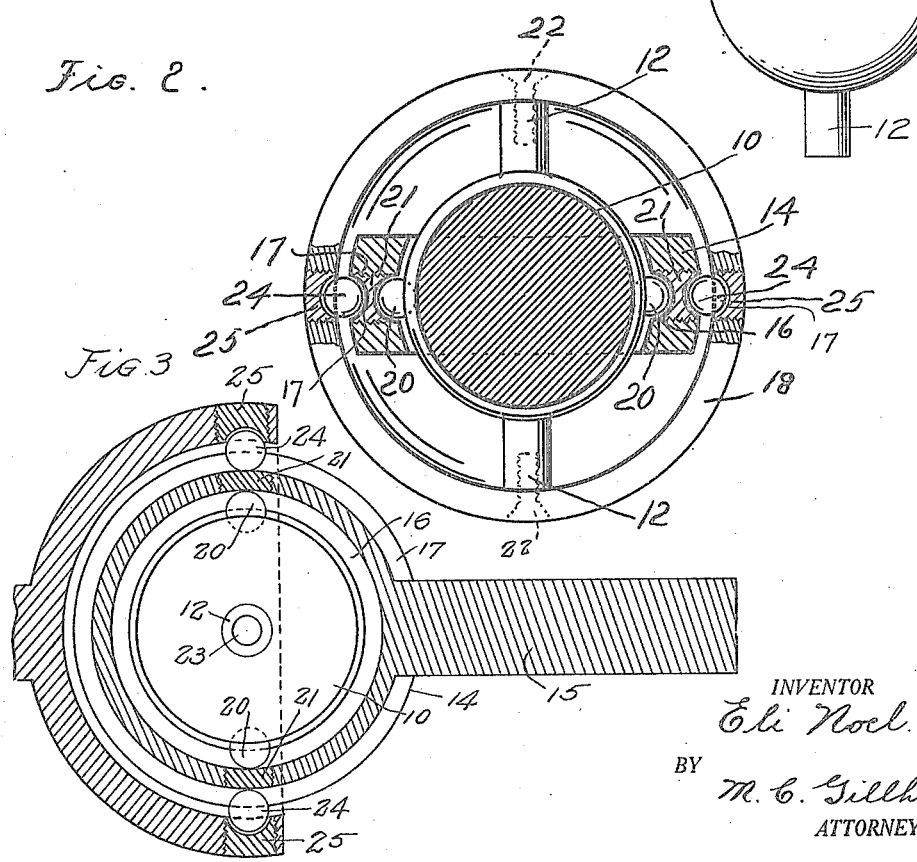
INVENTOR
Eli Noel.
BY
M. C. Gillham
ATTORNEY Patented Oct. 2, 1928.

1,685,859

UNITED STATES PATENT OFFICE.

ELI NOEL, OF KANSAS CITY, MISSOURI.

UNIVERSAL JOINT.

Application filed July 7, 1927. Serial No. 204,112.

My invention relates to universal joints, and the object of the invention is to provide an inexpensive and durable universal joint having great flexibility.

I attain these objects and other advantages by means of the mechanism and parts illustrated in the accompanying drawing in which—

Figure 1 is a side elevation of a universal joint which embodies my invention, partly broken away to show the assembly.

Figure 2 is a sectional view of the joint, on line 2—2, Figure 1, and showing the pivoting ball bearings to provide flexibility.

Figure 3 is a top plan view of the joint, partly sectioned, and showing the method of assembling the parts and, Figure 4 is an elevational view of the central spherical body of the joint, and showing one of the concaved ball receiving cavities therein.

Similar numerals of reference refer to corresponding parts throughout the several views.

The invention comprises a solid spherical body member 10 having integral arms at diametrically opposite sides, shown at 12, and concaved ball bearing receiving cavities 13 at diametrically opposite points located at right angles to said arms, an annular race member 14 having an inner race 16 and an outer race 17 therein for receiving ball bearings and a shaft 15 at its horizontal axis, and a cup member 18 having a shaft 19 at the horizontal axis thereof. Holes are bored transversely through the member 14 at diametrically opposite points and which holes are adapted to register with the ball receiving cavities 13, and holes are bored through the wall of the cup member 18 at diametrically opposite points and which holes register with the holes in the race member. Balls 20 are passed through the holes in the race member and loosely lodged in the ball receiving cavities in the spherical body, substantially one half of the balls being in the cavities in the said body and the other half thereof being in the race 16. Plugs 21 having their ends machined to conform to the contour of the races 16 and 17 are secured in the body of the race member in any suitable manner, preferably by investing the plugs with screw threads, thus confining the balls 20 partly in the spherical body and partly in the race 16. The cup member has an inner diameter at its mouth adapted to frictionally receive the ends of the arms 12 and be rigidly attached thereto by means of screws 22 screwed into the wall of the cup and screwed into holes 23 in the ends of the arms prepared to receive them. The screws are driven and set to hold the spherical body and the cup member as a rigid unit and for this purpose dowel pins (not shown) may be used in addition to the screws mentioned. Balls 24 are passed through the holes in the wall of the cup member and lodged in the race 17 and plugs 25 having their inner ends machined to form ball receiving cavities to receive the balls 24 are secured in the holes in the cup member in any suitable manner, preferably by screw threads. The plugs 21 and 25 are preferably removably mounted to facilitate repairs and the outer ends of the plugs may be provided with slots to receive the blade of a screw driver. The several parts of the joint are made of suitable metal, preferably steel.

The balls 20 and 24 in their environment function as pivots and as ball bearings, whereby the race member may be moved about the spherical body at various angles with respect to the cup member. The bearing balls also function as pivot connections to pivotally connect the cup member and the bearing member, whereby power may be transmitted to revolve the spindle or shaft 18 when it is at an angle to the cup member. The arrangement of the parts to move with accuracy and precision is a provision preventing lag or back lash. The joint is of great advantage in front wheel drive of automobiles where its flexibility allows the wheels to be deflected from straight alignment to steer the vehicle and to receive vertical shock to the wheels without injury.

Having described my invention what I claim is—

In a universal joint, a semi-circular hollow body having an axial shaft and diametrically opposite concaved bearing ball cavities therein, a central spherical solid body within said hollow body and movable therewith as a rigid unit and having diametrically opposite concaved bearing ball cavities therein adapted to register with the cavities in the hollow body, an annular bearing member movably surrounding said solid body and having an axial spindle or shaft and annular concaved bearing ball race opening to the solid body and an annular concaved bearing ball race opening to the wall of said hollow body, bearing balls movable in the cavities in said solid body and extending into the inner race in said bearing member, and bearing balls movable in the cavities in said hollow body and extending into the outer race in said bearing member.

Kansas City, Mo., June 27th, 1927.

ELI NOEL.